Nov. 26, 1957
B. B. HOLMES
2,814,290
RESPIRATORY APPARATUS
Filed April 25, 1952
2 Sheets-Sheet 1
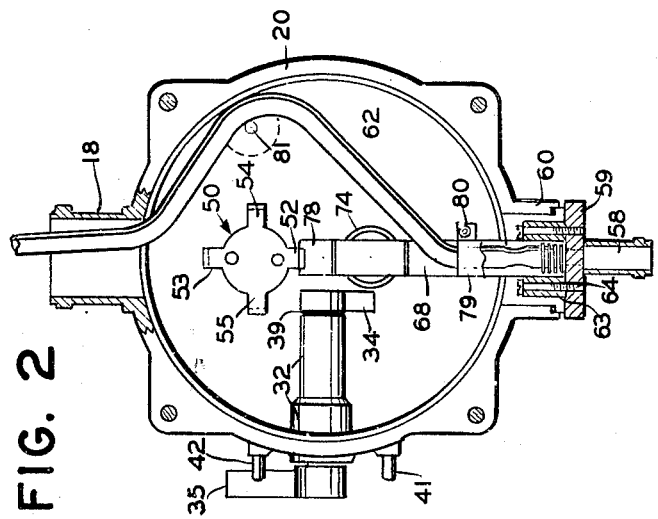
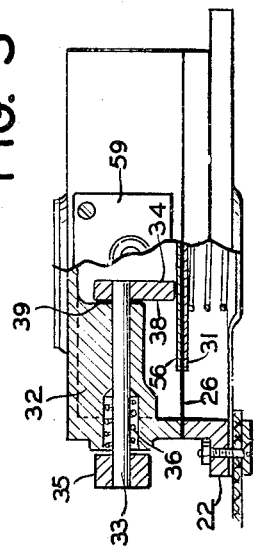
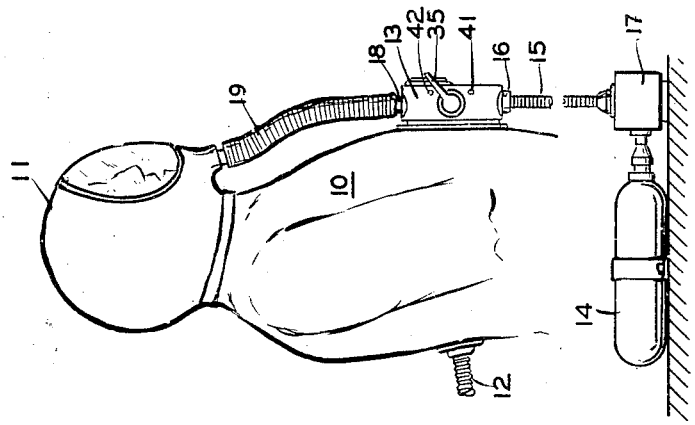
INVENTOR.
BRADFORD B. HOLMES
BY
ATTORNEY

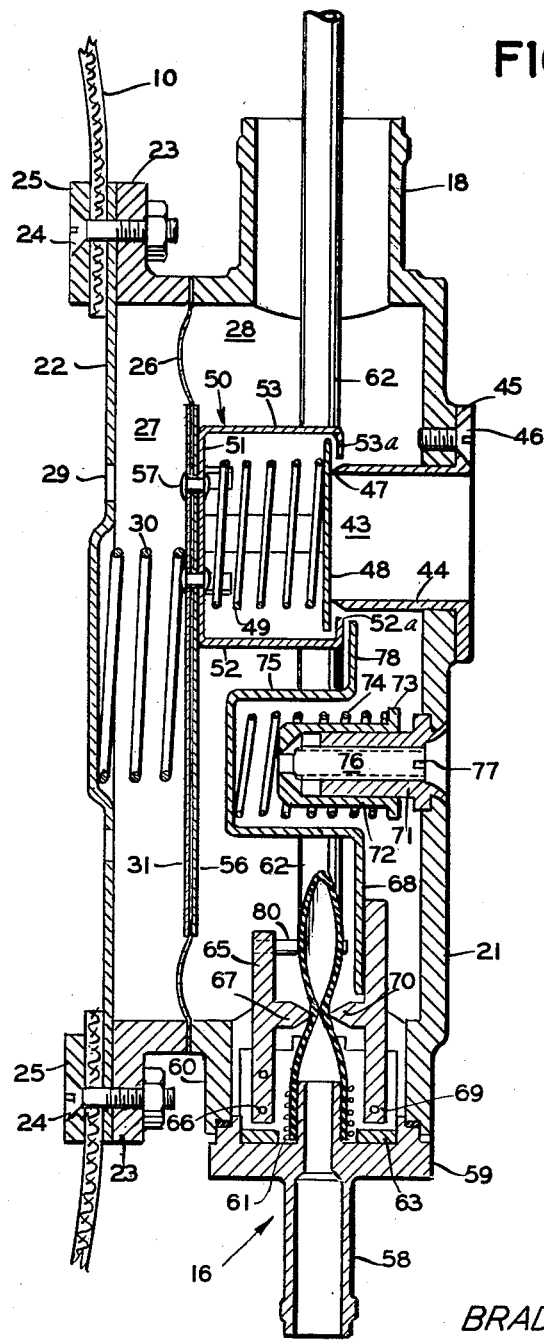

2,814,290

RESPIRATORY APPARATUS

Bradford B. Holmes, New York, N. Y., assignor to Bendix Aviation Corporation, Teterboro, N. J., a corporation of Delaware Application April 25, 1952, Serial No. 284,332

12 Claims. (Cl. 128—142)

This invention relates generally to respiratory apparatus and more particularly has to do with apparatus for regulating the delivery of respirant gases to the helmet of an aviator.

With the development of high altitude aircraft it has become common practice to provide the aviator with a pressure suit and to maintain a predetermined pressure therewithin during flight above a predetermined altitude. Suits of this type are usually constructed so as to include means whereby the interior of the suit is maintained in balance with ambient atmospheric pressure at altitudes up to about 38,000 feet, after which the suit is pressurized from a suitable source so as to maintain a pressure of about 3.2 p. s. i. a. therewithin during flight at altitudes in excess of 38,000 feet.

It has also become common practice to provide the aviator with a helmet to which is supplied the oxygen required to maintain normal human efficiency at altitudes in excess of 10,000 feet, and to sustain life at higher altitudes.

The present invention contemplates and has for one of its objects the provision of a novel demand regulator that is adapted to be mounted in and form a part of an aviator's pressure suit and which is connected to the helmet thereof so as to be operable in response to the respiration of the aviator to regulate the delivery of respirant gases such as air, or oxygen, to the helmet and to exhaust the exhalations therefrom.

A further object of the instant invention is to provide a novel demand regulator embodying means whereby at altitudes below a predetermined altitude ambient air is supplied to the helmet. Thus, by providing means for breathing the ambient air at altitudes where the air contains sufficient oxygen to maintain normal efficiency, the instant regulator operates in an efficient manner to conserve the supply of oxygen carried by the aircraft for the aviator's use.

Another object contemplated herein is to provide a novel demand regulator embodying means whereby the oxygen is delivered directly to the helmet and adjacent the aviator's nostrils to the end that a minimum amount of undesirable re-breathing of the oxygen supplied to the mask occurs.

The present invention also contemplates a demand regulator wherein means are provided to maintain a positive pressure within the helmet relative to ambient atmospheric pressure at a predetermined altitude. By providing this slight positive or "safety" pressure the oxygen supplied to the helmet is not diluted by the leakage of ambient atmosphere into the helmet.

A still further object of the instant invention is the provision, within a demand regulator having a respiratory responsive diaphragm controlling a demand valve, of means for substantially balancing the pressures effective on the diaphragm other than pressures produced by the respiration of the aviator to the end that a minimum of effort is required on the part of the aviator to actuate the diaphragm.

The above and other objects and advantages of the instant invention will become apparent to those skilled in the art from a consideration of the description which follows, taken together with the accompanying drawings wherein one embodiment of the novel demand regulator contemplated herein is shown by way of example. It is to be expressly understood, however, that the drawings are for purposes of illustration only and are not to be construed as limiting the scope of the present invention.

Referring now to the drawings wherein like reference characters designate like parts throughout the various views:

Fig. 1 is a fragmentary, side elevational view of an aviator's pressure suit and helmet, showing the novel demand regulator contemplated herein mounted in the suit and connected to the helmet and to a source of pressurized oxygen;

Fig. 2 is an elevational view partially in section showing the interior of the regulator with the cover removed;

Fig. 3 is a fragmentary view, partially in section, showing the means for controlling the movement, in one direction, of the respiratory responsive diaphragm of the instant regulator; and Fig. 4 is a longitudinal section through the novel regulator.

Referring now to Fig. 1, the reference character 10 designates an aviator's pressure suit, having a conventional helmet 11 for enclosing the head of the aviator. An inlet 12 communicating with a suitable source of fluid pressure, provides means whereby suit 10 is pressurized to maintain an internal pressure therewithin of about 3.2 p. s. i. a. at altitudes in excess of 38,000 feet. At altitudes below 38,000 feet, the internal pressure of suit 10 is maintained in balance with ambient atmospheric pressure. The suit 10 and the means for pressurizing the same, form no part of the instant invention and may be of any type well known in the art.

As will be hereinafter more fully set forth, the novel demand regulator contemplated herein, designated generally by reference character 13, is mounted in suit 10 so as to be disposed in front of the aviator's chest. A source of pressurized oxygen 14, which may be carried by the aircraft as shown in Fig. 1, or by the aviator, communicates through a suitable conduit 15 with an inlet fitting 16 of regulator 13. A pressure reducer 17, which may be of any type well known in the art, is interposed in conduit 15 between oxygen source 14 and inlet 16 to the end that the oxygen is delivered to inlet 16 at a constant pressure of about 15 p. s. i. Regulator 13 is provided with an outlet 18 which communicates through a flexible hose 19 with helmet 11.

As shown more particularly in Figs. 2 and 4, regulator 13 includes a substantially cylindrical body 20 closed at one end by a wall 21, and at the opposite end thereof by a cover 22 that is secured to body 20 by suitable means, not shown. Cover 22 is provided with a peripheral flange 23 and bolts 24 pass through registered openings in flange 23, suit 10 and a reenforcing ring 25 to secure regulator 13 to suit 10.

Body 20 and cover 22 serve to clampingly engage therebetween the periphery of a flexible diaphragm 26 which divides the interior of regulator 13 into chambers 27 and 28. Chamber 27 communicates with the interior of suit 10 by way of a plurality of openings or ports 29, formed through cover 22, while chamber 28 communicates with the interior of helmet 11 by way of outlet 18 and hose 19.

A spring 30 positioned between cover 22 and a bearing plate 31 carried by diaphragm 26 normally biases diaphragm 26 inwardly into chamber 28. As shown in Figs. 2, 3 and 4, means are provided whereby diaphragm 26 is held against movement into chamber 28. To that end, a support block 32 disposed in chamber 28 has rotatably mounted therein a shaft 33. At its inner end, shaft 33 has fixedly mounted thereon a cam or stop 34, while the outer end thereof, which extends to the exterior of body 20, has secured thereto a lever 35. A spring 36 encircling shaft 33 and seated in a recess formed in the outer end of block 32 is operative between the inner end of the recess and lever 35 to bias shaft 33 in an outwardly direction to the end that a portion of side 38 of cam 34 is pressed into frictional and sealing engagement with a resilient washer 39 positioned between side 38 of cam 34 and the inner end surface of block 32. Due to this construction, leakage along shaft 33 from chamber 28 to the exterior of body 20 is prevented and further, shaft 33 is securely held in either of two positions determined by the position of lever 35 relative to stops 41 and 42 carried by body 20. Thus, when lever 35 is positioned to engage stop 41, cam 34 engages a bearing plate 56 of diaphragm 26 and prevents the movement thereof into chamber 28, although diaphragm 26 is free to move into chamber 27 against the bias of spring 30. On the other hand, when lever 35 is rotated through 90° from stop 41 to stop 42, shaft 33 rotates cam 34 through 90° thereby moving it out of contact with bearing plate 56, as shown in Fig. 2, thus permitting the free movement of diaphragm 26 into either chamber 27 or chamber 28.

Valve means 43 are provided whereby chamber 28 and hence the interior of helmet 11 is communicated with ambient atmosphere. More particularly, valve means 43 comprise a cylindrical sleeve or port 44 that is mounted through a suitable opening formed in end wall 21 to extend inwardly into chamber 28. At its outer end port 44 communicates with the exterior of regulator 13 and is provided with a peripheral flange 45 and bolts 46 passing through registered openings in flange 45 and end wall 21 secure port 44 to end wall 21. At its inner end, port 44 communicates with chamber 28 and is provided with an annular knife-edge valve seat 47. A valve disc 48 having a greater outside diameter than valve seat 47, to the end that the peripheral portion of the former extends outwardly beyond the limits of the latter when engaged therewith, and a relatively light spring 49, are enclosed within a cage 50. Cage 50 includes a transverse end wall 51 having a plurality of fingers 52, 53, 54 and 55 that extend normally therefrom and the outer extremities of fingers 52, 53, 54 and 55 are bent inwardly and parallel to end wall 51 to form lateral flanges 52a, 53a, 54a and 55a, respectively. Spring 49 is operative between disc 48 and end wall 51 to bias disc 48 into engagement with flanges 52a, 53a, 54a and 55a.

Cage 50 is secured to bearing plate 56 carried by diaphragm 26 by rivets 57 which pass through registered openings in bearing plate 56, diaphragm 26 and bearing plate 31 and is positioned relative to port 44 so as to have disc 48 engageable with seat 47 of port 44. Thus, when diaphragm 26 is in a null position, as for example, when held in the position shown in Fig. 2, i. e., where cam 34 prevents the movement thereof by spring 30 into chamber 28, valve disc 48 is engaged with valve seat 47 by spring 49 and fingers 52, 53, 54 and 55 are disposed about, and extend partially along the length of port 44 and their respective flanges are out of contact with valve disc 48. Due to this construction, when diaphragm 26 is moved inwardly into chamber 27 from the null position thereof, fingers 52, 53, 54 and 55 move with diaphragm 26 and their respective flanges 52a, 53a, 54a and 55a engage valve disc 48 to raise the same off its coacting valve seat 47. Port 44 is thereby opened to communicate chamber 28 with the exterior of regulator 13 and the ambient atmosphere.

On the other hand, when diaphragm 26 moves into chamber 28, fingers 52, 53, 54 and 55 also move inwardly to the end that the flanges 52a, 53a, 54a and 55a thereof move away from valve disc 48. At the same time, the inward movement of cage 50 increases the bias of spring 49 and valve disc 48 to insure the tight, sealing engagement thereof with valve seat 47.

As hereinbefore set forth, regulator 13 is provided with an inlet fitting 16 to which oxygen is supplied at a constant pressure of about 15 p. s. i. Inlet fitting 16 includes an inlet pipe 58 having a mounting flange 59 that is adapted to be secured to and close the outer end of a cylindrical extension 60 formed on body 20. Extension 60 communicates at its inner end with chamber 28. Conduit 15 from oxygen source 14 is secured to the outer end of pipe 58, while the inner end of pipe 58, which extends into extension 60, has secured thereto by a spring 61, the end of a resilient tube 62. Tube 62 which may be formed of soft rubber or a suitable like material, extends through chamber 28, outlet 18 and helmet hose 19 to the interior of helmet 11 where the end thereof is secured adjacent the nostrils of the aviator.

To control the flow of oxygen through tube 62, a mounting block 63, positioned in extension 60 is secured to the inner side of flange 59 by bolts 64. A member 65 secured at one end to block 63 by pins 66 and extending into chamber 28, is provided medially of its length with a laterally disposed jaw 67 that engages one side of tube 62. A lever 68, pivotally mounted at one end thereof by a pin 69 to block 63, extends into chamber 28 and is provided with a laterally disposed jaw 70 that is positioned thereon so as to engage tube 62 on the diametrically opposite side thereof from jaw 67. Thus jaws 67 and 70 serve as fixed and movable jaws, respectively, that are adapted to clamp tube 62 therebetween and thereby control flow through the tube. To provide means whereby lever 68 is biased to pivot in a direction to move jaw 70 toward jaw 67 and thereby clamp tube 62 therebetween, a hollow post 71 is mounted through end wall 21 to extend inwardly into chamber 28. A cup-shaped member 72 having a peripheral flange 73 is slidably mounted on post 71 and a spring 74 is positioned between flange 73 and a U-shaped portion 75 of lever 68. To adjust the biasing force of spring 74 on lever 68, hollow post 71 is internally threaded to receive an externally threaded adjusting screw 76. Screw 76 extends through the inner end of post 71 where it engages the end wall of cup member 72. The outer end of screw 76 has a slot 77 formed therein to receive a suitable turning tool such as a screw driver. By rotating screw 76 in the proper direction, cup member 72 is moved on post 71 to adjust the biasing force of spring 74 on lever 68.

The inner end 78 of lever 68 is disposed within chamber 28 so as to be engageable with flange 52a of finger 52 when cage 50 is moved in the direction of end wall 21 by diaphragm 26. Thus, when diaphragm 26 moves inwardly into chamber 28, finger 52 engages end 78 of lever 68 to pivot the same against the bias of spring 74 to the end that movable jaw 70 moves away from fixed jaw 67. Since oxygen is delivered at about 15 p. s. i. to inlet pipe 58 it is manifest that the pressure of the oxygen forces open tube 62 and oxygen flows therethrough to helmet 11. Conversely, when diaphragm 26 moves into chamber 27, the withdrawal of finger 52 permits spring 74 to return movable jaw 70 to a position where it cooperates with fixed jaw 67 to clamp tube 62 therebetween and prevent oxygen flow through tube 62. Lever 68 also serves to close flow through tube 16 when the regulator is not in use.

To hold tube 62 in place within chamber 28, and to prevent its straightening upon oxygen flow therethrough, a clamp 79 carried by a pin 80 which in turn is secured to block 63 engages tube 62 adjacent jaws 67 and 70 and a second pin 81 is disposed in chamber 28 to hold tube 62 against the inner surface of body 20.

Having thus described the details of construction of the novel demand regulator contemplated herein, it will be apparent to one skilled in the art that at low altitude, for example, below 10,000 feet, regulator 13 is adjustable to permit the aviator to breathe the ambient atmosphere. To adjust regulator 13 for this type of operation, lever 35 is moved to abut stop 41 thereby rotating shaft 33 to a position where cam 34 engages bearing plate 56 of diaphragm 26 (Fig. 3). Assuming that the aviator's respiration is at a point between exhalation and inhalation, diaphragm 26 is now positioned as shown in Figs. 3 and 4, and is prevented from moving inwardly into chamber 28 by cam 34 but is free to move into chamber 27 against the bias of spring 30 and the pressure within chamber 27 communicated thereto from suit 10, through ports 29. Since, however, suit 10 is maintained at ambient atmospheric pressure at altitudes below 38,000 feet and the interior of helmet 11 and hence chamber 28 is also at this pressure, it is manifest that there is no pressure differential between chambers 27 and 28 that is effective on diaphragm 26. Upon an exhalation of the aviator wearing helmet 11 the positive pressure produced thereby is conducted through hose 19 and outlet 18 into chamber 28 to produce pressure differential between chambers 27 and 28 that is positive with respect to the latter. This positive pressure differential is effective to move diaphragm 26 into chamber 27. As diaphragm 26 moves in this direction it carries along with it cage 50 and the flanges of fingers 52, 53, 54 and 55 engage the edge of valve disc 48 to raise the same off its coacting seat 47 to thereby open port 44. The exhalation, therefore, passes from chamber 28 through port 44 into the atmosphere. As the exhalation ceases, the pressure in chamber 28 balances with ambient atmospheric pressure through port 44. Since suit 10 and chamber 27 are also at atmospheric pressure the pressure differential between chambers 27 and 28 is at zero and, therefore, spring 30 returns diaphragm 26 to engagement with stop 34.

Upon inhalation, the pressure within chamber 28 is reduced below atmospheric pressure thus producing a pressure differential between chambers 27 and 28 that is negative with respect to chamber 28 and which would be effective on diaphragm 26 to move it into chamber 28 were it not for stop 34 which prevents movement of diaphragm 26 in this direction. The negative pressure in chamber 28, however, is effective on the inner surface of valve disc 48, i. e., the surface engaged by spring 49. Since the opposite surface of disc 48 is exposed to ambient atmospheric pressure in port 44, it is manifest a pressure differential exists between chamber 28 and port 44 that is effective on disc 48 to disengage it from its coacting seat 47 against the bias of spring 49. Port 44 is therefore opened and the ambient atmosphere is drawn into chamber 28 and from thence through outlet 18 and hose 19 into helmet 11 to be inhaled by the aviator. As the inhalation ceases, the pressure chamber 28 is once more brought into balance with ambient atmospheric pressure and spring 49 returns valve disc 48 into engagement with valve seat 47 to close port 44.

At an altitude of about 10,000 feet, it is desirable to provide the aviator with oxygen and to maintain a slight positive pressure within helmet 11 to the end that the oxygen supplied thereto is not diluted by leakage of ambient atmosphere into helmet 11. To adjust regulator 13 for this type of operation lever 35 is rotated 90° to engage stop 42 thereby rotating stop 34 through 90° and disengaging the same from diaphragm 26. Diaphragm 26 is now free to move into either chamber 27 or chamber 28.

As stop 34 is removed from engagement with diaphragm 26, spring 30 moves the diaphragm into chamber 28. The inward movement of cage 50 engages finger 52 thereof with end 78 of lever 68 to the end that the latter pivots against the bias of spring 74 to move jaw 70 slightly away from jaw 67. Oxygen from inlet pipe 58 now flows through tube 62 into helmet 11 where it builds up a pressure therewithin that is passed back through hose 19 and outlet 18 into chamber 28. Assuming that the aviator has paused in his respiration, between inhalation and exhalation, the pressure of the oxygen builds up in chamber 28 until a pressure differential between chambers 27 and 28 is produced that is positive with respect to the latter and which is effective on diaphragm 26 to balance the biasing force imposed thereon by spring 30. At this point, spring 74 returns lever 68, and hence jaw 70, to a position where the latter once more cooperates with jaw 67 to clamp tube 62 therebetween and stop the flow of oxygen into helmet 11. The pressure of the oxygen within helmet 11 and chamber 28 is then at about .25 inch of water. This slight positive, or "safety" pressure in chamber 28 and helmet 11 prevents the inward leakage of ambient atmosphere into helmet 11 to the end that the oxygen supplied thereto is not diluted.

Upon exhalation, the positive pressure produced thereby in chamber 28, increases the positive pressure differential between chambers 27 and 28 causing diaphragm 26 to move into chamber 27 against the bias of spring 30. As diaphragm 26 moves in this direction, finger 52 disengages from end 78 of lever 68 and spring 74 moves it to clamp tube 62 between jaws 70 and 67, fingers 52, 53, 54 and 55 thus engage disc 48 to move it off its coacting seat 47 and thereby open port 44. The exhalation, therefore, passes out through port 44 into the atmosphere. As the exhalation ceases, the pressure in chamber 28 tends to return to atmospheric pressure, however, due to the bias of spring 30 the "safety" pressure of about .25 inch of water hereinbefore set forth is maintained in chamber 28 and helmet 11.

Upon inhalation, the pressure in chamber 28 is reduced and the pressure differential between chambers 27 and 28 is negative with respect to the latter. Spring 30 and the pressure differential move diaphragm 26 inwardly into chamber 28 and finger 52 engages lever 68 to move it against spring 74. Jaw 70 moves away from jaw 67 and oxygen now flows through tube 62 into helmet 11 where it is inhaled by the aviator. As diaphragm 26 moves inwardly spring 49 is compressed to increase the biasing effect thereof on disc 48. Therefore, under these conditions of a pressure differential that is negative with respect to chamber 28, valve disc 48 remains in sealing engagement with its coacting seat 47 to maintain valve port 44 closed.

The negative pressure produced in chamber 28 by the inhalation gradually reduces as inhalation ceases and the pressure differential produced between chambers 27 and 28 also reduces. Spring 74, therefore, moves lever 68 and hence jaw 70 toward jaw 67 to clamp tube 62 between the jaws. Due to the biasing force of spring 30, however, the positive pressure differential of about .25 inch of water, hereinbefore described, is once more established and maintained in chamber 28 and helmet 11.

Above 38,000 feet, suit 10 is pressurized by suitable means, not shown, but well known in the art, to maintain a positive pressure therewithin of about 3.2 p. s. i. a. This positive pressure passes through ports 29 into chamber 27 where it is effective on diaphragm 26. Assuming, once more, that the aviator has paused between an exhalation and an inhalation, the biasing force produced by spring 30 and the 3.2 p. s. i. a. in chamber 27 produces a pressure differential between chambers 27 and 28 that is positive relative to the former. Diaphragm 26, therefore, moves into chamber 28 and finger 52 thereupon engages end 78 of lever 68 to move the latter and permit flow through tube 62 into helmet 11. The pressure of the oxygen within helmet 11 is reflected back through hose 19 into chamber 28 where it becomes effective on diaphragm 26. As in the instance of "safety" pressure, the pressure within chamber 28 builds up until the pressures within chambers 27 and 28 are balanced and the pressure differential therebetween returns to zero. At this point, the pressure of the oxygen in chamber 28 and helmet 11 is at about 3.2 p. s. i. a. and the pressure in chamber 27 is at the same value due to the pressurization of suit 10, The operation of regulator 13 in response to exhalation and inhalation under these conditions is the same as that hereinbefore described with respect to respiration during the time when safety pressure is maintained in the helmet, with the exception that instead of maintaining a slight positive pressure of about .25 inch of water in the regulator, a pressure of about 3.2 p. s. i. a. is now maintained therein.

It is to be noted that in various operations of regulator 13 hereinbefore set forth, the pressure differential between chambers 27 and 28 is substantially at zero value at the time of the commencement of an exhalation or inhalation. Of course, when stop 34 is disengaged from diaphragm 26, spring 30 serves to maintain a slight positive pressure in chamber 28 of about .25 inch of water. It is manifest, therefore, that regulator 13 operates in response to a minimum effort on the part of the aviator.

Having thus described the details of construction and operation of the novel demand regulator contemplated herein, it will be apparent to those skilled in the art that the various objects of the present invention hereinbefore set forth have been achieved.

Moreover, while only one embodiment of the novel demand regulator has been illustrated and described, it is understood that changes in the form and arrangement of the various elements thereof, which will now be apparent to those skilled in the art, may be made without departing from the scope of the invention.

I claim:

1. An oxygen demand regulator adapted to be mounted to a pressurizeable suit and connected to a helmet, comprising a casing, a diaphragm in said casing defining therewithin first and second pressure chambers, conduit means on the casing for connecting said first chamber to the helmet and port means on the casing for connecting said second chamber to the suit whereby said diaphragm is actuated by a pressure differential between said first and second chambers occasioned by respiration in the helmet and the pressure in the suit, an oxygen inlet, a resilient tube connected at one end to said inlet and passing through said first chamber and conduit means and terminating in the helmet, a fixed jaw engaged with one side of said tube, a movable jaw engageable with the diametrically opposite side of said tube, a lever connected to said movable jaw, means biasing said lever in a direction to clamp said tube between said movable and fixed jaws to close flow through said tube, valve means communicating said first chamber with the exterior of said casing, said valve means including a port having a valve seat in said first chamber, a valve disc engageable with said valve seat, resilient means biasing said valve disc into engagement with said valve seat, and a plurality of fingers carried by said diaphragm and engageable with either said lever or said valve disc, said plurality of fingers being operable upon actuation of said diaphragm in response to a first pressure differential between said first and second chambers to disengage said valve disc from said valve seat to open said valve means and communicate said first chamber to atmosphere, and at least one of said plurality of fingers being operable upon actuation of said diaphragm in response to a second pressure differential between said first and second chambers to engage said lever and move said movable jaw away from said fixed jaw to open said tube and permit oxygen to flow through said tube to the helmet.

2. In a demand regulator adapted to be mounted in a pressure suit and connected to a helmet, the combination comprising a casing, a diaphragm in said casing defining first and second pressure chambers therein, means on the casing for communicating said first and second chambers with the helmet and suit, respectively, for actuating said diaphragm to move into either said first or said second chamber in response to a pressure differential produced therebetween by respiration within the helmet and the pressure in the suit, the pressure differential being negative with respect to said first chamber upon inhalation and positive with respect thereto upon exhalation, first biasing means in said second chamber to move said diaphragm inot said first chamber, stop means engageable with said diaphragm to prevent movement of said diaphragm into said first chamber, valve means in said first chamber communicating with the exterior of said casing, said valve means including a port having a disc engageable therewith, second biasing means between said diaphragm and disc to move said disc into engagement with said port to close said port, and yieldable to disengage said disc from said port to open the same against said second biasing means when said stop means are engaged with said diaphragm and the pressure differential in said first chamber is negative, and means carried by said diaphragm and engageable with said disc to disengage said disc from said port to open the same upon movement of said diaphragm into said second chamber when the pressure differential in said first chamber is positive, an oxygen inlet to said first chamber, a resilient tube connected to said inlet and passing through said first chamber into the helmet, and clamping means engageable with said tube and normally operative to clamp said tube to prevent flow therethrough, said disc engaging means carried by said diaphragm being engageable with said clamping means upon movement of said diaphragm into said first chamber by said first biasing means when said stop means are disengaged from said diaphragm to thereby actuate said clamping means to permit flow through said tube into the helmet and maintain the pressure differential in said first chamber positive between inhalations and exhalations.

3. In a demand regulator adapted to be mounted in a pressure suit and connected to a helmet, the combination comprising a casing, a diaphragm in said casing defining first and second pressure chambers therein, means on the casing for communicating said first and second chambers with the helmet and suit, respectively, for actuating said diaphragm to move into either said first or said second chamber in response to a pressure differential produced therebetween by respiration within the helmet and the pressure in the suit, the pressure differential being negative with respect to said first chamber upon inhalation and positive with respect thereto upon exhalation, first biasing means in said second chamber to move said diaphragm into said first chamber, stop means engageable with said diaphragm to prevent movement of said diaphragm into said first chamber, valve means in said first chamber communicating with the exterior of said casing, said valve means including a port having a disc engageable therewith, second biasing means between said diaphragm and disc to move said disc into engagement with said port to close said port, and yieldable to disengage said disc from said port to open the same against said second biasing means when said stop means are engaged with said diaphragm and the pressure differential in said first chamber is negative, and means carried by said diaphragm and engageable with said disc to disengage said disc from said port to open the same upon movement of said diaphragm into said second chamber when the pressure differential in said first chamber is positive, an oxygen inlet to said first chamber, a resilient tube connected to said inlet and passing through said first chamber into the helmet, and tube clamping means controlling flow through said tube, said disc engaging means carried by said diaphragm being operable to actuate said clamping means upon movement of said diaphragm into said first chamber by said first biasing means when said stop means are disengaged from said diaphragm to maintain the pressure differential in said first chamber positive between inhalations and exhalations.

4. In a demand regulator adapted to be mounted in a pressure suit and connected to a helmet, the combination comprising a casing, a diaphragm in said casing defining first and second pressure chambers therein, means on the casing for communicating said first and second chambers with the helmet and suit, respectively, for actuating said diaphragm to move into either said first or said second chamber in response to a pressure differential produced therebetween by respiration within the helmet and the pressure in the suit, the pressure differential being negative with respect to said first chamber upon inhalation and positive with respect thereto upon exhalation, first biasing means in said second chamber to move said diaphragm into said first chamber, stop means engageable with said diaphragm to prevent movement of said diaphragm into said first chamber, valve means in said first chamber communicating with the exterior of said casing, said valve means including a port having a disc engageable therewith, second biasing means between said diaphragm and disc to move said disc into engagement with said port to close said port, and yieldable to disengage said disc from said port to open the same against said second biasing means when said stop means are engaged with said diaphragm and the pressure differential in said first chamber is negative, and means carried by said diaphragm and engageable with said disc to disengage said disc from said port to open the same upon movement of said diaphragm into said second chamber when the pressure differential in said first chamber is positive.

5. An oxygen pressure control system comprising a pressurizeable suit, a helmet, a demand regulator connected to the suit and the helmet, means including a diaphragm in said regulator responsive to a pressure differential caused by respiration in the helmet and pressure in the suit, first valve means in said regulator for connecting the helmet with the atmosphere, second valve means in the regulator for connecting the helmet with a source of oxygen, and means carried by said diaphragm and alternately actuating said first and second valve means to open and close in response to actuation of said diaphragm by said pressure differential.

6. In combination, a pressure chamber, means including a diaphragm responsive to negative and positive pressures in said chamber, a first valve in said chamber, actuating means for said first valve including a lever engaging said valve, and normally holding said first valve in closed position, a second valve in said chamber including a port and a closure disc engageable therewith, means carried by said diaphragm and engageable with said lever upon actuation of said diaphragm in response to negative pressure in said chamber to operate said actuating means to open said first valve, and engageable with said disc upon actuation of said diaphragm in response to positive pressures in said chamber to disengage said disc from said port and open said second valve, and means limiting the actuation of said diaphragm to positive pressure in said chamber.

7. In combination, a pressure chamber, means including a diaphragm responsive to said negative and positive pressures in said chamber, a valve in said chamber including a valve port comprising a valve seat and a valve disc engageable therewith, resilient means between said diaphragm and valve disc biasing said valve disc into engagement with said valve seat to close said valve port, said responsive means being responsive to negative pressure in said chamber to move the diaphragm and increase the biasing force of said resilient means on said valve disc, means carried by said diaphragm and engageable with said valve disc upon actuation of said diaphragm in response to positive pressure in said chamber to disengage said valve disc from said valve seat to open said valve port, and means engageable with said diaphragm to limit the response thereof only to positive pressure in said chamber, said valve disc biasing means being yieldable under negative pressure in said chamber to disengage said disc from said valve seat and open said valve port when the responsiveness of said diaphragm is limited as aforesaid.

8. In combination, a pressure chamber, means including a diaphragm responsive to said negative and positive pressures in said chamber, a valve in said chamber including a valve port comprising a valve seat and a valve disc engageable therewith, resilient means between said diaphragm and valve disc biasing said valve disc into engagement with said valve seat to close said valve port, said responsive means being responsive to negative pressure in said chamber to move the diaphragm and increase the biasing force of said resilient means on said valve disc, and means carried by said diaphragm and engageable with said valve disc upon actuation of said diaphragm in response to positive pressure in said chamber to disengage said valve disc from said valve seat to open said valve port, and means preventing the actuation of said diaphragm in response to negative pressure.

9. A demand regulator comprising a pressure chamber having a port, a port-controlling valve including a seat and a closure disc engageable with the seat, resilient means biasing said disc into port-closing engagement with the seat, means including a diaphragm moved in response to positive and negative pressures in said chamber, and means carried by the diaphragm for operating said valve, including a disc-lifting structure connected to and movable with the diaphragm under positive pressure in the chamber into engagement with the side of the disc opposite to the diaphragm, and movable with the diaphragm under negative pressure in the chamber away from said disc and out of engagement therewith.

10. An oxygen demand regulator adapted to be mounted to and form a part of a breathing mask, said regulator including a breathing chamber communicating with the mask, a respiratory responsive diaphragm in said chamber, a passageway communicating said chamber to the exterior of said regulator, a vent valve controlling flow through said passageway, said vent valve including a valve seat, a valve disc, resilient means biasing said valve disc into sealing engagement with said valve seat, at least one finger carried by said diaphragm and engageable with said valve disc upon movement of said diaphragm in one direction whereby said valve disc is disengaged from said valve seat to communicate said chamber with the exterior of said regulator and means engageable with said diaphragm to move the same in said one direction.

11. In an oxygen demand regulator having a chamber and an oxygen inlet to said chamber, the combination comprising a demand valve at said inlet controlling flow through said inlet into said chamber, a vent valve, a respiratory responsive diaphragm, means carried by said diaphragm and operated thereby to alternately open and close said demand valve and vent valve, and means engageable with said diaphragm to move and maintain said diaphragm to and in an inactive position in which said demand valve remains closed and said vent valve remains in operation.

12. In an oxygen demand regulator, the combination comprising a chamber, an oxygen inlet to said chamber, inlet valve means controlling flow through said inlet into said chamber, a respiratory responsive diaphragm in said chamber, vent means communicating said chamber to atmosphere, means carried by said diaphragm and engageable with said inlet valve and vent means to alternately open and close said inlet valve and vent means in response to respirations, resilient means biasing said diaphragm to actuate said inlet valve and vent means to maintain a predetermined pressure of oxygen in said chamber, and means engageable with said diaphragm and operable to maintain said diaphragm in an inactive position in which said inlet valve means are closed and said vent means remains in operation to communicate said chamber with atmosphere.

(References on following page)

References Cited in the file of this patent

UNITED STATES PATENTS

| | | |
|---|---|---|
| 1,131,490 | Drager | Mar. 9, 1915 |
| 1,926,069 | Sutton | Sept. 12, 1933 |
| 2,384,669 | Fields | Sept. 11, 1945 |
| 2,523,906 | Holmes | Sept. 26, 1950 |
| 2,593,046 | McKee | Apr. 15, 1952 |
| 2,596,178 | Seeler | May 13, 1952 |
| 2,598,525 | Fox | May 27, 1952 |
| 2,685,288 | Fields et al. | Aug. 3, 1954 |

FOREIGN PATENTS

| | | |
|---|---|---|
| 946,521 | France | Dec. 20, 1948 |